(12) United States Patent
McQuarrie (10) Patent No.: US 9,276,758 B2
(45) Date of Patent: Mar. 1, 2016

(54) ANALYZING AND REPAIRING DOCUMENTS

(75) Inventor: Mary Elizabeth McQuarrie, Arroyo Grande, CA (US)

(73) Assignee: Adobe Systems Incorporated, San Jose, CA (US)

(*) Notice: Subject to any disclaimer, the term of this patent is extended or adjusted under 35 U.S.C. 154(b) by 1723 days.

(21) Appl. No.: 12/069,548

(22) Filed: Feb. 11, 2008

(65) Prior Publication Data
US 2013/0124532 A1 May 16, 2013

(51) Int. Cl.
*G06F 3/00* (2006.01)
*H04L 12/24* (2006.01)
*G06F 17/21* (2006.01)
*G06F 17/27* (2006.01)

(52) U.S. Cl.
CPC .............. *H04L 12/24* (2013.01); *G06F 17/212* (2013.01); *G06F 17/2725* (2013.01)

(58) Field of Classification Search
CPC .... H04L 12/24; G06F 17/212; G06F 17/2725
See application file for complete search history.

(56) References Cited

U.S. PATENT DOCUMENTS

| 6,490,603 B1* | 12/2002 | Keenan ................. G06F 17/218 715/235 |
| 2002/0078406 A1* | 6/2002 | Kondoh et al. ................. 714/48 |
| 2004/0100656 A1* | 5/2004 | Kuroki .......................... 358/1.16 |
| 2005/0262430 A1* | 11/2005 | Croft .............................. 715/507 |
| 2006/0053093 A1* | 3/2006 | Bonham et al. ..................... 707/3 |
| 2006/0155699 A1* | 7/2006 | Purvis et al. ....................... 707/6 |
| 2007/0156732 A1* | 7/2007 | Surendran et al. ............. 707/101 |
| 2008/0177994 A1* | 7/2008 | Mayer ............................... 713/2 |
| 2008/0212138 A1* | 9/2008 | Truong et al. ................. 358/1.18 |
| 2009/0158219 A1* | 6/2009 | Raghupathy et al. .......... 715/863 |

OTHER PUBLICATIONS

Adobe Systems Incorporated. "Adobe Labs—Ads for Adobe PDF." [Online] Feb. 7, 2008. <http://labs.adobe.com/technologies/adsforpdg/>.

* cited by examiner

*Primary Examiner* — Tarek Chbouki
(74) *Attorney, Agent, or Firm* — Wolfe-SBMC (57) ABSTRACT

Techniques for analyzing and repairing documents are described, including evaluating a document at a first location using a first application, the document comprising one or more parameters and being formatted using a document standard, identifying a problem associated with the document by comparing the one or more parameters to the document standard, presenting a status associated with the document, wherein the status is associated with the one or more parameters, and repairing the problem a second location using a second application by modifying at least one of the one or more parameters associated with the document.

21 Claims, 6 Drawing Sheets

ANALYZING AND REPAIRING DOCUMENTS

FIELD OF THE INVENTION

Examples relate generally to software and user interfaces. More specifically, techniques for analyzing and repairing documents are described.

BACKGROUND

Electronic documents ("documents") are typically created using conventional applications that rely upon a format or standard that identifies layouts, fonts, and other attributes of how to construct, generate, and layout the document. For example, a document may be created in a text format (e.g., American Standard Code for Information Interchange ("ASCII")), a specialized format (e.g., a format for a spreadsheet or a visual presentation), a format that combines two or more media (e.g., text with data representing images, videos, or audios, or data in another medium), a format using a markup language (e.g., Extensible Markup Language ("XML) or Hypertext Markup Language ("HTML")), or a portable format (e.g., Portable Document Format ("PDF") or XML Paper Specification ("XPS")). However, conventional document formatting techniques are problematic.

Conventional solutions lack consistency in terms of how documents are displayed. For example, conventional solutions often include or embed unnecessary fonts, unreferenced images, or excessively large images. Alternatively, conventional applications often do not include enough fonts or images referenced in a document. Further, conventional solutions do not provide the ability for users, skilled or otherwise, to determine the quality of a document with regard to any discrepancies with a document format or standard. Thus, problems associated with users' perception of quality with regard to how well a document is formatted according to a document format or standard can affect user adoption, commercial success, or other factors. Another problem associated with conventional solutions is the inability to repair problems or issues that affect the quality of a document.

Thus, a solution for improving the quality of documents without the limitations of conventional techniques is needed.

BRIEF DESCRIPTION OF THE FIGURES

Various examples are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Adobe® Integrated Runtime™ (Adobe® AIR™), ActionScript™, FleX™, Lingo™, Java™, Javascript™, Ajax, Perl, COBOL, Fortran, ADA, XML, MXML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Various techniques for analyzing and repairing documents are described, including evaluating, reporting problems and quality issues, repairing, fixing, or resolving (i.e., repairing) problems and quality issues, or other operations associated with documents. Devices, computing systems, user interfaces, computer programs, software, applications, processes, methods, and programming instructions that implement various techniques for analyzing and repairing documents are also described. These and other techniques may be implemented in any application, including those executed on mobile devices that access or view documents. Various techniques for analyzing and repairing documents may be selectively implemented. In other examples, different techniques may be implemented differently and are not limited to the examples provided and described.

Figure 1:
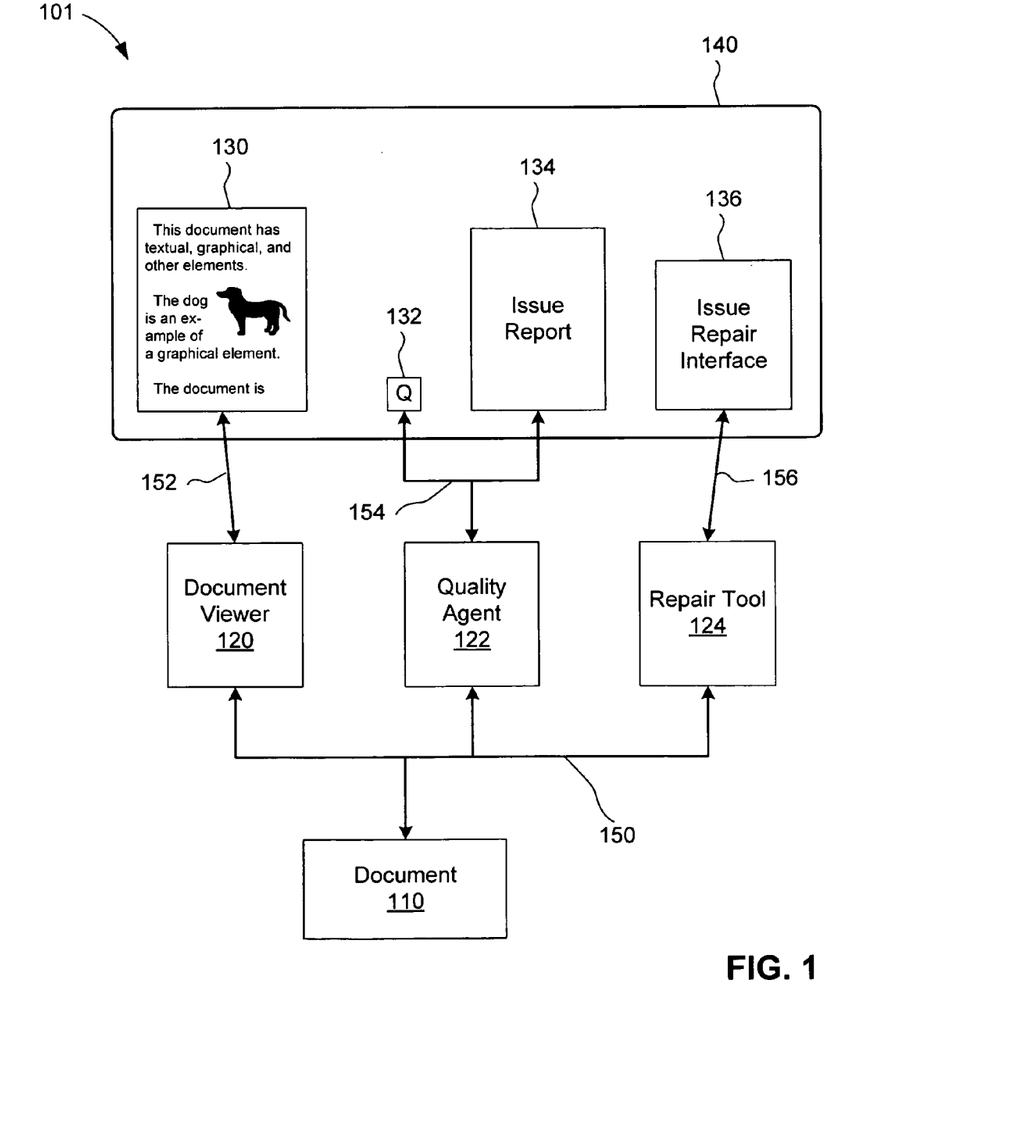
FIG. 1 illustrates an exemplary environment where documents may be accessed.

FIG. 1 illustrates an exemplary environment where documents may be accessed. Here, environment 101 shows document 110, document viewer 120, quality agent 122, repair tool 124, document interface window 130, document status interface 132, document report interface 134, document repair interface 136, display 140, and communication paths 150-156. Document viewer 120, quality agent 122, and repair tool 124 may communicate with each other or access document 110 using, for example, communication path 150 or one or more other communication paths (not shown). In some examples, document viewer 120 may communicate with a device, such as display 140, to interface with document interface window 130 using communication path 152 or another path (not shown). Quality agent 122 may communicate with, for example, display 140 to interface with document status interface 132 or document report interface 134 using communication path 154 or another path (not shown). Repair tool 124 may communicate with, for example, display 140 to interface with document repair interface 136 using communication path 156 or another path (not shown). Communication path 150, 152, 154, or 156 may be a wired or wireless path, internal or external to a device or system. Although not shown in environment 101, one or more input devices (e.g., a keyboard, pointer control, mouse, touch screen, or the like) may be used to provide input data or signal to, for example, interface with document interface window 130, document status interface 132, document report interface 134, or document repair interface 136.

In some examples, there may be no quality agent 122 or more than one quality agent 122; no document viewer 120 or more than one document viewer 120; or no repair tool 124 or more than one repair tool 124. Document viewer 120, quality agent 122, and repair tool 124 may communicate with one or more other devices (not shown) instead of or in addition to display 140. Display 140 may be a display of a mobile device (e.g., a personal digital assistant, smartphone, or cellular phone), laptop computer, desktop computer, or another device or system. In software implementations, document viewer 120, quality agent 122, and repair tool 124 may be implemented as a process, separate threads, or separate processes running in one or more devices (e.g., computers) connected in a data network (e.g., an intra-network or inter-network). For example, quality agent 122 or repair tool 124 may be a module, thread, fiber, sub-process, or process spawned, forked, or otherwise started by an operating system or a running process (e.g., a process running document viewer 120). In other examples, repair tool 124 may be a module within quality agent 122, a thread of a process running quality agent 122, or another process separated from a process running quality agent 122. Environment 101 may be varied in design, configuration, implementation, structure, function, or other aspects and is not limited to the examples shown and described.

In some examples, document viewer 120 opens document 110 and may display or otherwise present document 110 in document interface window 130. Document viewer 120 may be any application, tool, or module (e.g., a plug-in to an application) having the capability to access a document. Accessing a document (e.g., document 110) may include viewing, editing, reviewing, commenting (e.g., marking up and replying in collaboration), attaching additional data (e.g., an image), signing (i.e., adding a signature), or another purpose or operation. In some examples, document viewer 120 may be an application (e.g., an editor) having, for example, at least some or all of the above described capabilities to edit or otherwise modify document 110. In other examples, document viewer 120 may be a document viewing tool or application designed primarily for viewing a document. Document viewer 120 may be widely or freely available (e.g., available for downloading).

Documents 110 may be any document in electronic form. Document 110 may include data representing one or more media, such as text, graphic, images, videos, animations, audios, binary objects, and other data, such as metadata (i.e., data about the document or document content). In some examples, document 110 may be formatted according to a document standard or specification. For example, document 110 may be created (e.g., by a tool or application) using a specification of a document standard. A document standard may define one or more structures, syntax, page layouts, contents, forms, fonts, objects (e.g., images, videos, audios, subroutines, or programming code), hyperlinks, annotations, metadata (e.g., data regarding the identification of a document creating application), one or more flags or data fields (e.g., a flag indicating enablement of fast web view (i.e., a formatting technique for downloading of a document one page at a time as opposed to an entire document) support in a document), or other aspects of a document. Examples of document standards may include ASCII, HTML, XML, Extensible Hypertext Markup Language ("XHTML"), Scalable Vector Graphics ("SVG"), Synchronized Multimedia Integration Language ("SMIL™"), PDF, XPS, Open Document Format ("ODF"), and others.

In some examples, a document standard may be a portable document format, standard, or specification. For example, a portable document standard may be a self-contained document format. Documents formatted according to a portable document standard may include the resources (e.g., fonts, color maps, images, three-dimensional ("3D") objects, or other data) for displaying or rendering documents in different devices, systems, or environments. Documents formatted using a portable document standard may be rendered in a similar or substantially similar manner (e.g., having the same look, feel, interface, functions, structures or other aspects) across multiple platforms, systems, devices, or environments.

In some examples, document viewer 120 may analyze, scrutinize, examine, review, verify, or otherwise evaluate (collectively "evaluate") document 110. In other examples, document viewer 120 may initiate, start, or launch a document evaluator (e.g., quality agent 122) to evaluate document 110. In some examples, quality agent 122 may evaluate document 110 in a manner that does not affect or substantially affect displaying or otherwise accessing document 110. For example, quality agent 122 may be executing in a thread or process having a priority (i.e., execution priority) in an operating system lower than the priority of another process running document viewer 120. As another example, quality agent 122 may be running as a background process in an operating system. A user accessing document 110 while the document is being evaluated (e.g., by quality agent 122) may not notice a significant performance derogation in displaying, viewing, interacting with, or otherwise accessing the document.

Document 110 may be evaluated for quality factors, issues, potential issues, or other attributes associated with the document. For example, document 110 may be evaluated to determine one or more attributes or parameters of attributes relating to conformance or compliance to a document standard (e.g., structure, syntax, or other aspects, such as those described above); accessibility levels (i.e., the document's accessibility by persons with visual, audio, or other disabilities); target viewing or operating platforms (e.g., whether the document is optimized for Internet access or enabled for fast web view); embedded resources (e.g., number of fonts or images, including their sizes or any fragmentation); compression (e.g., compression schemes or levels used on images or other contents); orphan contents (e.g., un-referenced contents); or other aspects associated with document 110. For example, optimized for Internet or network access may include compressing data (e.g., down sampling images) to reduce file size. Enable for fast web view may refer to structuring a document, turning on or flagging a switch or data field in a document, or a combination thereof, to allow a document to be displayed before the document is fully downloaded. For example, when a page of a document is downloaded, the page may be displayed. If a document is not enabled for fast web view, the document may have to be downloaded (e.g., fully or substantially downloaded) before a page or part of the document may be displayed.

Parameters associated with a document (e.g., document 110) may be associated with aspects relating to a document standard or aspects not relating to a document standard. In some examples, one or more parameters may be configurable. For example, there may be parameters associated with various aspects or attributes of a document standard (e.g., syntax error, formatting structure, or embedded resources) that may be modified. A parameter, for example, may be configured to flag or otherwise indicate a syntax error with respect to a document standard if a given type of error (e.g., an error relating to the structure or page layout) or number of errors (e.g., three) have been found. Another parameter may be configured to indicate non-compliance with a document standard if, for example, document 110 fails to meet conditions, parameters, attributes, or characteristics (e.g., not including a font, image, or another resource referenced in the document). Parameters may be compared to a document standard to determine compliance or a lack thereof. In some examples, a difference between a document (e.g., document 110) and a document standard may occur with one or more parameters. For example, if a document has a parameter that meets or exceeds a threshold, a difference between the threshold and the parameter may be used to indicate that the document presented in document interface window 130 or document status interface 132 does not conform to or meet a document standard. Otherwise, differences may not be indicated or may be ignored.

In some examples, there may be parameters, configurable or non-configurable, associated with other aspects of a document (e.g., file size, application identification ("ID"), compression methods, security implementations, or platform-related indications, such as accelerated or fast web view). For example, there may be a parameter associated with the file size of document 110, a parameter associated with an application ID (i.e., of the application created document 110), or a parameter associated with a flag in document 110 (e.g., setting a flag indicating turning on fast web view). In some examples, there may be other attributes or parameters associated with document accessibility. Document accessibility or access may refer to the configuration of a document to provide access to the document to persons with disabilities (e.g., visual or audio disabilities). For example, a document may include captions or tags associated with image data to provide descriptions of images (e.g., for reading using a Braille-reading device or listening using a text-readout device). In some examples, a document structure for accessibility may include a tree structure that represents the logical organization of a document and each document element may be tagged. For example, first level headers, second level headers, paragraphs, footnotes, running headers are examples of document elements that may be tagged. As an example, processes configured to use a tree structure representing the logical organization of a document may be configured to reflow (i.e., resize, display, or otherwise present differently than originally specified in a document) data associated with a document to be more suitable for use as assistive technology.

In some examples, document status interface 132 may be displayed or presented after evaluation of document 110. Document status interface 132 may be presented, for example, as an icon or widget in display 140 apart from document interface window 130 (i.e., in separated windows) or within document interface window 130. In some examples, document status interface 132 presents an indicator of the quality of document 110 based on an evaluation of document 110. As used herein, the term "quality" with respect to document 110 refers generally to whether an attribute, parameter, property, or criterion (collectively "criteria") is met or substantially met. In other examples, sets of criteria may be used. For example, a set of criteria may include one or more criteria, which may be user or system-determined. In some examples, if criteria are met, then a document may be indicated as being of a "higher quality." In other examples, quality may also be determined by whether one or more select criteria ("key criteria") are met. As used herein, "key criteria" may refer to criteria that are indicated as being more important than others. In yet other examples, quality of a document may be determined by the number of criteria met and whether key criteria are met. Meeting a criterion may be determined by meeting or exceeding a threshold. Meeting a criterion may also be determined by whether the criterion are at or near a threshold (e.g., within a certain range, such as 10 percent, of a threshold) associated with the criterion. In some examples, a threshold may be set or changed by a user.

In some examples, document status interface 132 may present various types of indicators, including a color indicator, a numerical indicator, a textual indicator, other visual indicator, or a combination thereof. For example, document status interface 132 may include a set of two key criteria and other criteria ("non-key criteria"). In some examples, each key criterion, when met, may be given an arbitrary value of 25 percent, and each non-key criterion, when met, may be given an arbitrary value of 10 percent. The sum of percentages may be assigned a status, indicator, or symbol. In some examples, different sums may be assigned different symbols. In an implementation of four levels of status, for example, a sum of 85 percent or more may be indicated using various types of labels, symbols, letters, colors, or other techniques. Likewise, a sum of, for example, 70 to 84 percent may be presented by a neutral face, letter "M", yellow color, numerical value, or other techniques. A sum of 55 to 69 percent may be presented by a sad face, letter "L", red color, numerical value, or another indicator or status. A sum of below 55 percent may be presented by different symbols, letters, colors, indicators, status indicators, or other techniques. In other examples, there may be fewer than four levels of status (e.g., pass or no pass) or more than four levels of status (e.g., a status for each ten-percent increment).

In some examples, document report interface 134 may be displayed or presented after evaluation of document 110. Document report interface 134 may be displayed instead of or in addition to document status interface 132. In other examples, interaction with document status interface 132 may cause document report interface 134 to be presented. For example, when a user interfaces with (e.g., clicks on) document status interface 132, document report interface 134 may "pop-up," appear, display, or otherwise be presented to show the status of one or more parameters. The parameters being displayed may be selected based on meeting one or more criteria. For example, when quality agent 122 is configured to evaluate four criteria (e.g., optimizing for Internet access, accessibility, document standard compliance, embedded resources), document report interface 134 may show one or more parameters relating to each criteria that contribute to a document's quality status (e.g., included in a status shown in document status interface 132). A report may state, for example, that a document is not optimized for Internet access, is partially optimized for Internet access (e.g., 60 percent optimized), or is not optimized for Internet access. A report may also indicate that a document is not supporting or supporting visual-impaired, audio-impaired, or another type of accessibility. Further, a report may indicate that a document includes a number of syntax errors with respect to a document specification or fails to include resources (e.g., images or fonts). Still further, a report may indicate that a document includes an excessive number of resources (e.g., 1000 images or uncompressed images) or resources of a given size.

In some examples, a user may initiate repairing or otherwise modifying a document (e.g., document 110) to change the document based on one or more problems or issues. Issue repairing may be initiated from document interface window 130, document status interface 132, document report interface 134, or another window or interface (not shown). For example, a user may select one or more issues from document report interface 134 and indicate or request repairing various issues, such as by clicking on a "repair" button (not shown). Further, issue repairing may be initiated by starting repair tool 124, such as by directing 124 to open and evaluate document 110 independent of document viewer 120, quality agent 122, or both. In other examples, document viewer 120, quality agent 122 or another entity may start repair tool 124.

In some examples, repair tool 124 may be a local service. A local service may be a service executed in the same process as quality agent 122 or document viewer 120 or a service executed in the same device or same operating system as quality agent 122 or document viewer 120. In other examples, repair tool 124 may be a hosted service (e.g., a service provided by an application in a remote location, a web-based service hosted by an application service provider, or the like). In repairing a document (e.g., document 110), document repair interface 136 may be displayed or otherwise presented. For example, document repair interface 136 may be displayed with one or more issues or problems (e.g., quality issues, such as syntax errors or lack of optimization for Internet access). A user may, for example, select one or more issues for repairing. When an issue is selected, a signal may be sent from issue repair interface 136 to repair tool 124 to repair one or more selected issue. In some examples, document repair interface 136 may receive status (e.g., of a successful or failed repair) from repair tool 124.

In some examples, repair tool 124 may repair document 110 in a manner that does not affect or substantially affect displaying or otherwise accessing document 110. For example, repair tool 124 may be executed in a thread or process having a priority in an operating system lower than the priority of another process running document viewer 120 or quality agent 122. In another example, repair tool 124 may be running as a background process in an operating system. Access of document 110 while the document is being repaired (e.g., by repair tool 124) may not result in performance degradation while simultaneously or substantially displaying, viewing, interacting with, or otherwise accessing document 110.

Figure 2:
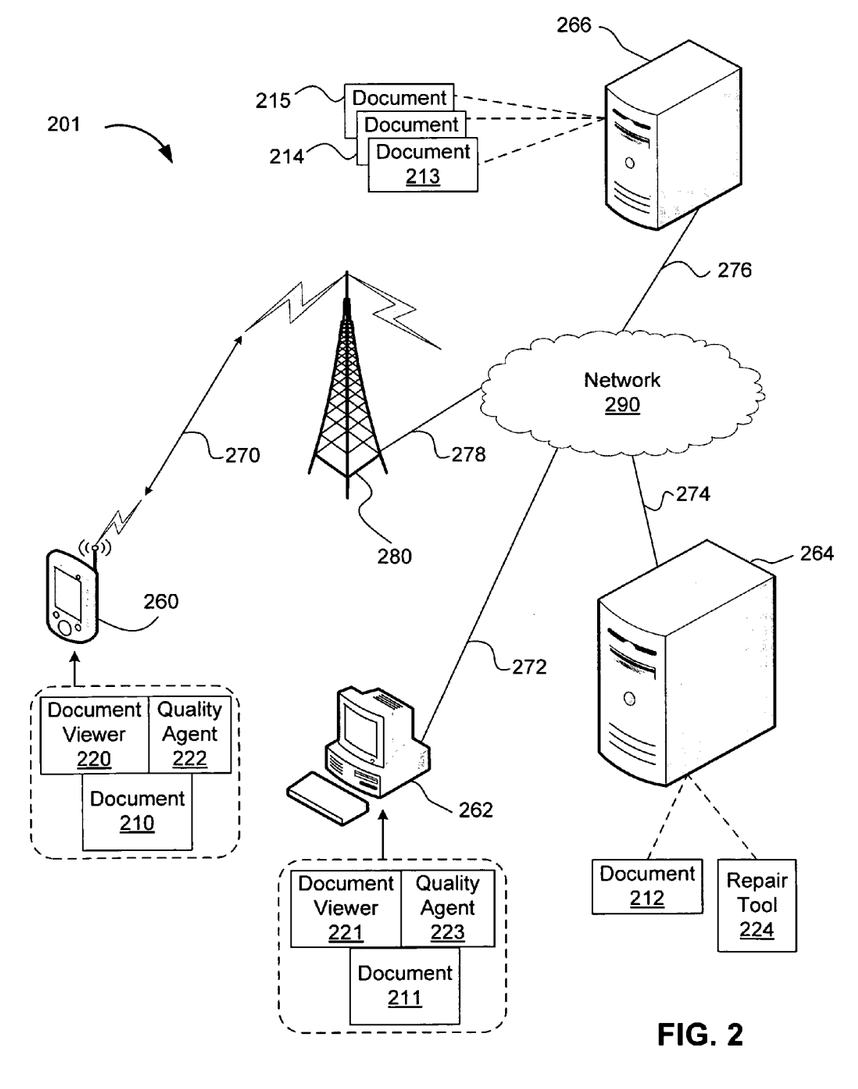
FIG. 2 illustrates an exemplary system where documents may be accessed.

FIG. 2 illustrates an exemplary system where documents may be accessed. Here, system 201 includes documents 210-215, document viewers 220 and 221, quality agent 222-223, repair tool 224, device 260, computer 262, servers 264-266, communication paths 270-278, communication structure 280, and network 290. In some examples, the number and type of the above-referenced elements may be varied and are not limited to any specific quantity, configuration, topology, or type. Documents 210-215 may reside at any location (e.g., device 260, computer 262, servers 264-266, or a repository (not shown)).

In some examples, documents 210-211 may be accessed (e.g., viewed, evaluated, repaired, or the like) using, for example, device 260, computer 262, or servers 264-266. Examples of portable devices include personal digital assistants ("PDA"), smartphones, cellular phones, portable computers (e.g., laptop computers), and other devices designed for portability or mobility (e.g., a device installed in a vehicle or airplane). Here, device 260 may be used to access a local document 210 or a remote document (e.g., one of documents 211-215). In some examples, a remote document may be downloaded to device 260 before accessing. For example, a remote document (e.g., one of documents 211-215) resides or exists in computer 262, server 264 or 266, or another repository (not shown) and may be downloaded using network 290, communication path 278, communication structure 280, or communication path 270. In other examples, a remote document may be downloaded and accessed simultaneously or substantially simultaneously. Device 260 may access a document, local or remote, using document viewer 220 or quality agent 222 (e.g., evaluated by document viewer 220 or quality agent 222). In some examples, device 260 may include a repair tool (not shown) to repair a document.

In some examples, a document (e.g., document 211) may be accessed (e.g., viewed, evaluated, or repaired) using a device not designed for portability or mobility, such as computer 262. Here, computer 262 may be used to access a local document 211 or a remote document (e.g., one of documents 210 and 212-215). In some examples, a remote document may be downloaded to computer 262 before accessing. For example, a remote document (e.g., one of documents 210 and 212-215) may be stored or housed in device 260, server 264 or 266, or another repository (not shown) may be downloaded via network 290 and communication path 272. In other examples, a remote document may be downloaded and accessed concurrently (i.e., accessed the portion of a remote document that has been retrieved or transmitted to computer 262). Computer 262 may access a document, local or remote, using document viewer 221 or quality agent 223 (e.g., evaluated by document viewer 221 or quality agent 223). In some examples, computer 262 may include a repair tool (e.g., repair tool 224) to repair document 211.

In system 201, device 260, computer 262, or another client (not shown) may access documents 210-215 from local or remote locations for viewing, evaluating, or repairing, as described above. For example, a document may be evaluated according to one or more parameters. As an example, device 260 may include one or more parameters configured to evaluate a document (i.e., locally or remotely) against a document standard (e.g., syntax error, formatting structure, or embedded fonts), one or more parameters configured to evaluate accessibility support, one or more parameters configured to evaluate a document remotely for embedding excessive or unnecessary resources (e.g., unnecessary or unused images or fonts), file size, or another parameter configured to evaluate a document remotely for enabling fast web view. Other parameters may be used and are not limited to those described. For example, when evaluating document 210 at device 260, quality agent 222 may perform an evaluation using one or more of the above-described parameters or others. When evaluating a document (e.g., document 210-215), quality agent 222 may perform an evaluation according to various parameters. The evaluation may be reported using a status indicator (not shown), issue report (not shown), or other technique. In some examples, device 260 may include one or more parameters that may be used for evaluating a local document (e.g., document 210) and not a document downloaded to, for example, device 260.

After a document is evaluated, a status associated with the document may be presented (e.g., via document status interface 132, FIG. 1) or one or more issues may be reported (e.g., via document report interface 134, FIG. 1). In some examples, one or more problems or issues associated with a document may be modified or repaired. For example, a user may initiate (e.g., via document report interface 134, FIG. 1) repairing or modifying a document according to one or more parameters based on an evaluation of the document. In some examples, a document may be repaired locally (i.e., executing repair tools/services within device 260 or computer 262). In other examples, a document (e.g., document 210) may be repaired by a remote service, such as repair tool 224 executed (i.e., run) on server 264. A remote service may include a quality agent (not shown) for evaluating a document (e.g., documents 210-215). In still other examples, a document may be evaluated or repaired differently using configurations other than those shown and described (e.g., a remote service involving a different application or a user performing or initiating the analysis of a document or repair of an identified issue). As an example, device 260 may be used to view or evaluate a document (e.g., document 210-215) using document viewer 220 or quality agent 222, which may be executed in one or more processes executed or running on an operating system. If device 260 does not include quality agent 222, documents 210-215 may be evaluated by an evaluation service (not shown). After evaluating documents 210-215, one or more problems or issues ("issues") may be determined. Using device 260, a request may be initiated to modify the document according to one or more parameters to improve accessibility supports or repair other issues (e.g., relating to a document standard). A modification request, documents 210-215, or a combination thereof may be sent to repair tool 224 using, for example, one or more of communication paths 270-278. In other examples, repair tool 224 may modify documents 210-215 to repair an issue by modifying one or more parameters. Repair tool 224 may be executed in one or more processes (e.g., as application service provider processes) executed or run on one or more operating systems of server 264. After an issue has been repaired, documents 210-215 may be sent to or downloaded by device 260.

In some examples, there may be more than one instance of repair tool 224 running on one or more servers (e.g., server 264). Server 264 may respond to or serve requests from any number of clients (e.g., device 260, computer 262, and others). In some examples, server 264 may be configured to provide fee-based services to repair documents. For example, a paid document evaluation service (not shown), document repair service, or other type of service may be provided using the techniques described herein. As an example, a portable device (e.g., device 260), non-portable client (e.g., computer 262), or other type of client may encounter one or more problems or issues when accessing a document (e.g., documents 210 or 211, respectively). Issues may include, for example, illegal syntax, accessibility issues, image fragmentations, improper compression on images (e.g., images being uncompressed or compressed with older or incompatible techniques), hidden, orphan, or damaged text, data, or pages (e.g., needs to be removed), or others.

In other examples, a document may be optimized (i.e., issues may be repaired) before being shared or accessed on a network. For example, documents 210-215 may be optimized to download sample images, video data or audio clips, according to page content, for fast web view, to ensure documents 210-215 are formatted in accordance with a document standard, to support accessibility or access, or other purposes other than those described. In some examples, tools, such as quality agent 122 (FIG. 1) or repair tool 124 (FIG. 1) may be used to detect whether a document was created using an outdated application or a lower quality application by another vendor (e.g., via an application ID field in the document), providing an opportunity to protect a vendor's reputation, present sales or advertisements (e.g., for purchasing updated or upgraded versions of the application or related products or services), or establish other commercial relationships with users. For example, quality agent 122 (FIG. 1) may be used by one vendor to identify, detect, or reveal (e.g., in a technical support situation) that a document was created by an application made by another vendor ("third party"). In some examples, quality agent 122 (FIG. 1) may detect whether a given document was created by a third-party application developed by another vendor. Detection of usage of a third-party application, with regard to a given document, provides the ability to decline support or offer the opportunity to purchase support to repair or improve a document using the techniques described herein. Using the techniques described, a vendor may also, upon detection of a third-party application's usage, present information to a user that identifies an application other than the vendor's was used to create, modify, or otherwise edit the document, thus avoiding reputational harm or other detrimental business or technical effects. In some examples, users may elect to purchase a service from the vendor, license an application, or engage in other activities with a vendor to provide an application that may repair or improve a document for a fee. In some examples, the reputation of a vendor may be protected, for example, by identifying issues associated with a document that were caused by a third-party application. In some examples, an application may be used to access a document formatted according to a portable document format (e.g., PDF) and to detect issues caused by a third-party or different application used to create the document. For example, a portable document format authoring and editing application (e.g., Acrobat® developed by Adobe Systems, Incorporated of San Jose, Calif., and others) may be used to implement the described techniques in order to detect issues caused by other applications that may generate poorly formatted documents. As an example, when users access (i.e., open) a PDF document using an application, issues created by another application that was used to create the document may be incorrectly attributed to the accessing application. However, using the techniques described herein, issues may be accurately identified and attributed to their proper source and solution. In other examples, the above techniques may be varied with respect to the types, sources, or developers of applications using the described techniques and are not limited to any specific example set forth.

In addition to implementing the described techniques as, for example, fee-based services for purposes such as evaluating, repairing, or optimizing a document, the described techniques may be used differently. For example, services (e.g., evaluating or repairing a document) may be offered free of charge or at a reduced fee to promote other products or services or in exchange for users accepting or enabling advertisement in documents. The above-described devices, services, processes, interfaces, components, or systems may be varied in number, design, configuration, implementation, structure, function, or other aspects and are not limited to the examples shown and described.

Figure 3A:
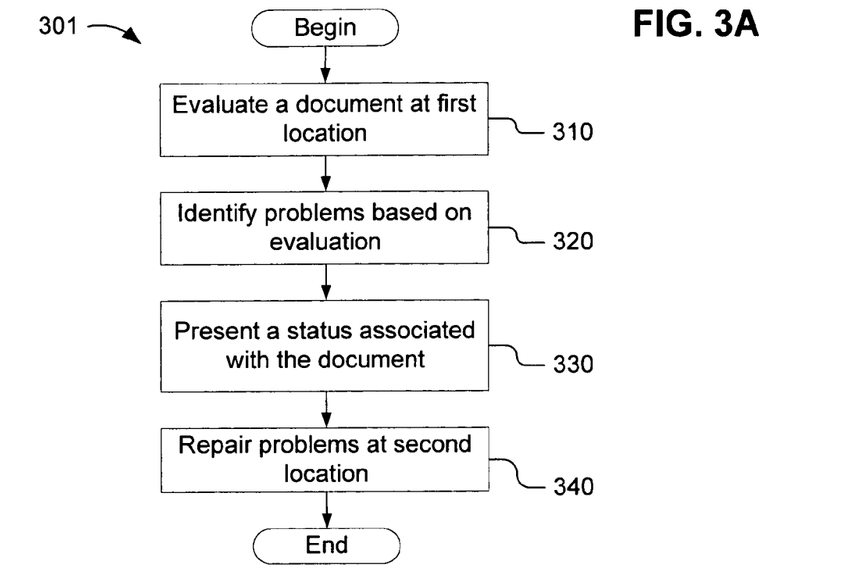
FIG. 3A is an exemplary process for analyzing and repairing documents.

FIG. 3A is an exemplary process for analyzing and repairing documents. Here, process 301 is suitable for implementation as, for example, a computer program code, software instructions, firmware, circuitry, logic, hardware, or a combination thereof. In some examples, a document (e.g., documents 210-215 (FIG. 2)) is evaluated at a first location (310). When performing an evaluation, there may be one or more parameters or attributes associated with a document to evaluate or compare against a document standard, formation, or specification. For example, a document may be formatted according to a document standard using one or more parameters. The document may be retrieved or downloaded before being opened or otherwise accessed by, for example, a document viewer, editor, tool, or other application. The accessing application or another application may perform the evaluation of the document. One or more problems (i.e., issues) may be identified based on the evaluation of the document (320). A document may be evaluated according to one or more parameters using the same or a different process other than that used to display the document. For example, one or more parameters may be associated with a document standard (e.g., accessibility, embedded fonts, typefaces, formats, layouts, and others). A status or indicator, as described above, for example, may be presented (330). The status is associated with a document and may incorporate the conditions of any number of parameters associated with the document. After identifying one or more problems or presenting the status, repair may be effected at a second location, allowing a document to be improved or "optimized," as described above, for downloading, rendering, presentation, or the like (340). In some examples, a repair may be performed by the same application performing the evaluation or by another application, located locally or remotely, as described above. As an example, one or more problems may be repaired by modifying one or more parameters, if found to be not in accordance with a document standard. Modification of a document may be based on one or more parameters used in performing an evaluation. For example, if a document is evaluated and a problem with a parameter is found (i.e., a parameter is not in accord with a document standard (e.g., illegal syntax, font, typeface, or others)), the parameter may be modified. In some examples, the above-described process may be varied in design, order, implementation, or other aspects, and is not limited to the examples shown and described.

Figure 3B:
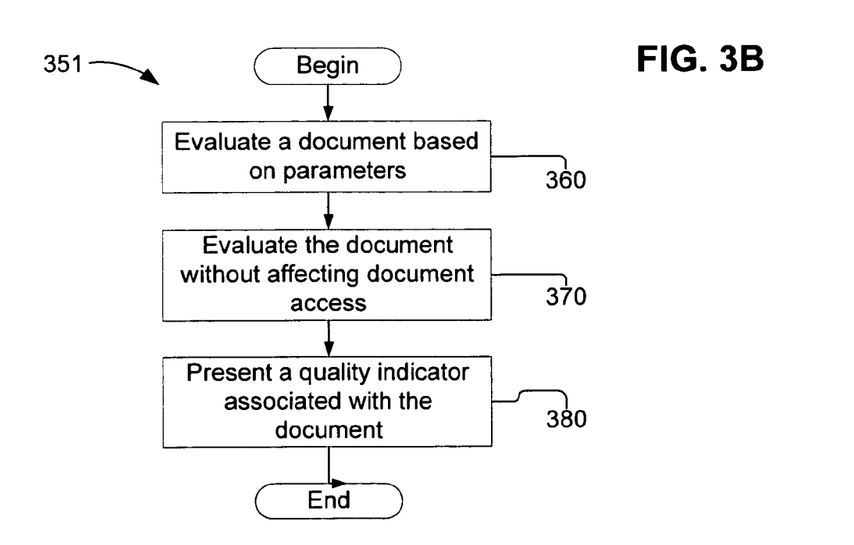
FIG. 3B is an exemplary drill-down process for evaluating a document.

FIG. 3B is an exemplary drill-down process for evaluating a document. Here, a document is evaluated based on one or more parameters (360). Parameters, as described herein, may be associated with different aspects of a document (e.g., document standard, accessibility, remote access, embedded resources, optimization, or others). In some examples, one or more parameters may be configurable. A document may be evaluated without affecting document access (370). For example, as described above, a document may be evaluated using a lower priority process, a background process, or another method. As evaluation progresses or after an evaluation is terminated, a status (e.g., a quality indicator) associated with the document may be presented (380). A status may include factors, key criteria, non-key criteria, thresholds, or others. In some examples, some criteria may be weighted (e.g., key criteria). In other examples, a user may define one or more criteria or one or more thresholds. A status may be displayed or presented, for example, in a document status interface 132 (FIG. 1). One or more issues may be reported in, for example, document report interface 134 (FIG. 1). Further, one or more issues may be repaired as described herein. In some examples, the above-described process may be varied in design, order, implementation, or other aspects, and is not limited to the examples shown and described.

Figure 4A:
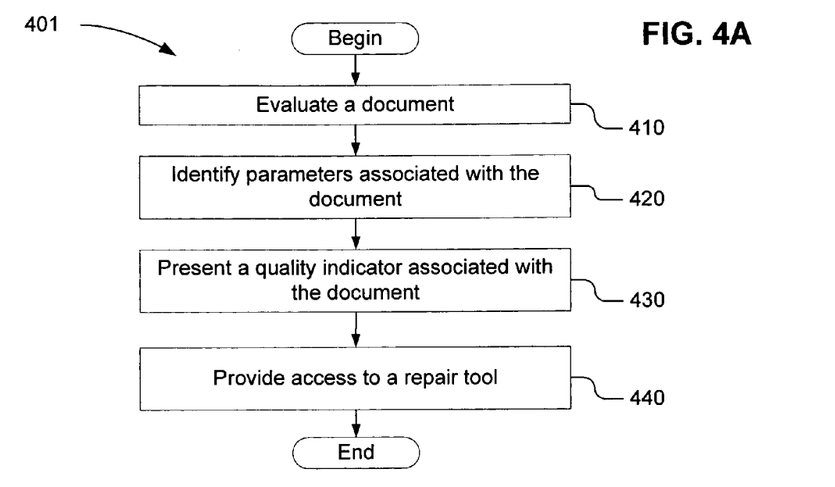
FIG. 4A is an alternative exemplary process for analyzing and repairing documents.

FIG. 4A is an alternative exemplary process for analyzing and repairing documents. Here, a document is evaluated (410). In some examples, a document may be evaluated by comparing the document to a document standard (i.e., standard, format, or specification). One or more parameters associated with the document are identified for modification in order to repair the document (420). For example, the document may be evaluated to identify parameters related to a portable document specification. In some examples, an evaluation may be performed by a process spawned or started by another application (e.g., a document viewer) accessing the document. The identified parameters may be compared, for example, to a portable document format, standard, or specification. As used herein, format, standard, or specification may be used interchangeably. A quality indicator (i.e., status) associated with a document may be presented (430). A quality indicator may be generated based on comparing one or more parameters against one or more thresholds. For example, a quality indicator may present a status if one or more parameters associated with the document are above a threshold (e.g., a red status indicator is presented if a document has a file size above a given limit) and present another status if the parameters are below another threshold (e.g., a green status indicator is presented if a document has a file size below a given limit). Access to one or more repair tools may be presented (440). Based on the identification of issues associated with a document, repairs may be performed as described above. In other examples, the above-described process may be varied in design, order, implementation, or other aspects, and is not limited to the examples shown and described.

Figure 4B:
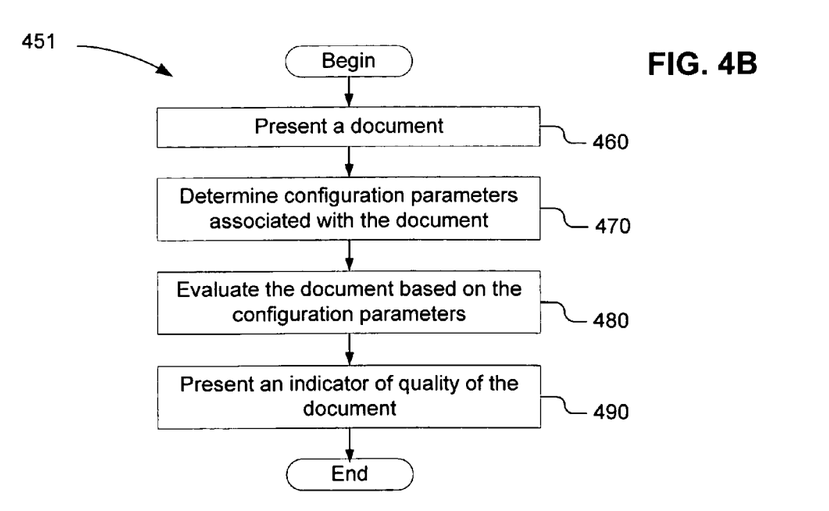
FIG. 4B is another alternative exemplary process for analyzing and repairing documents.

FIG. 4B is another alternative exemplary process for analyzing and repairing documents. Here, a document is presented (i.e., displayed) (460). The document may be formatted according to a document standard. One or more parameters or attributes associated with the document are evaluated (470). In some examples, parameters associated with the document may be configurable, for example, by users. Configuration parameters may be associated with various aspects or attributes of the document. For example, there may be one or more parameters associated with an attribute associated with the accessibility of the document. There may be parameters associated with other attributes (e.g., document structure, syntax, embedded resource, optimization, or web access) associated with a document. In some examples, a document may be evaluated according to one or more parameters or configuration parameters (480). As an example, an evaluation may include determining whether parameters comply with various attributes associated with the document (e.g., a document standard, format, or specification). An indicator of quality of a document is presented (490). In some examples, an indicator may present a quality status, as described above, based on the evaluation of a document. Issues associated with a document may be repaired, as described above. In other examples, the above-described processes may be varied in design, order, implementation, or other aspects, and are not limited to the examples shown and described. Further, the described processes may be suitable for implementing as programming instructions or in an application, such as the exemplary application described in FIG. 5.

Figure 5:
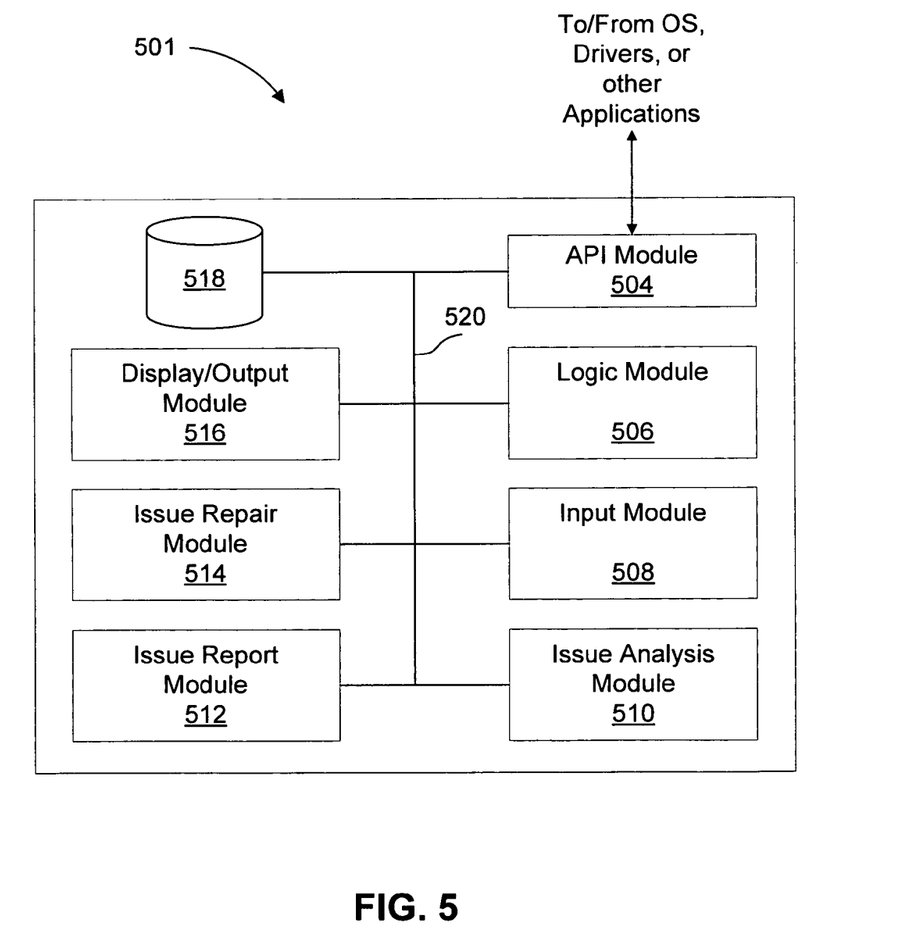
FIG. 5 illustrates an exemplary application architecture for analyzing and repairing documents.

FIG. 5 illustrates an exemplary application architecture for analyzing and repairing documents. Here, application 501 includes application programming interface ("API") module 504, logic module 506, input module 508, issue analysis module 510, issue report module 512, issue repair module 514, display/output module 516, repository 518, and bus 520. In some examples, API module 504, logic module 506, input module 508, issue analysis module 510, issue report module 512, issue repair module 514, display/output module 516, and repository 518 may be in data communication with each other, other applications, operating systems, drivers, or the like using bus 520 or API module 504. In some examples, bus 520 may be a logical or physical coupling configured to allow data transfer between processes such as those described. Further, API module 504 may be in data communication with one or more external processes (not shown) using actual or physical ports (not shown), processes, or other data interfaces.

Other external processes may include, but are not limited to operating systems ("OS"), drivers (e.g., input/output, disk drive, and graphic circuit drivers), firmware, applications, state machines, virtual state machines, and others.

In some examples, when data is received by API module 504, it may be transferred to one or more other modules (e.g., logic module 506, input module 508, issue analysis module 510, issue report module 512, issue repair module 514, display/output module 516, repository 518, and others) using bus 520. For example, after display/output module 516 has displayed a document status or quality indicator (e.g., document status interface 132, FIG. 1), API module 504 may receive data or signals from an input driver (not shown) input data or signal, for example, to interact with the quality indicator. The input data may be communicated to input module 508 for processing (e.g., determining which module is being accessed, which parameter associated with a document is being configured). In some examples, input data may be used to direct issue report module 512 to generate and present information on an interface (e.g., document report interface 134, FIG. 1) associated with reporting one or more issues associated with a document. In other examples, input data may be used by issue repair module 514 to generate and present information on an interface (e.g., document repair interface 136, FIG. 1) to repair one or more issues associated with a document.

In some examples, logic module 506 may be configured to control data flow through bus 520 and direct services provided by API module 504, input module 508, issue analysis module 510, issue report module 512, issue repair module 514, display/output module 516, and repository 518 to implement techniques for analyzing and repairing documents. For example, a document and a document standard (e.g., a portable document specification) may be stored in repository 518. In response to an input activating a document evaluation process, logic module 506 may direct issue analysis module 510 to retrieve a document, a document standard, or a combination thereof, from repository 518, direct issue report module 512 to layout document status interface 132 (FIG. 1), and direct display/output module 516 to display document status interface 132 (FIG. 1). Application 501 and the above-described modules and elements may be varied in design, function, configuration, implementation, or other aspects and are not limited to the descriptions provided above.

Figure 6:
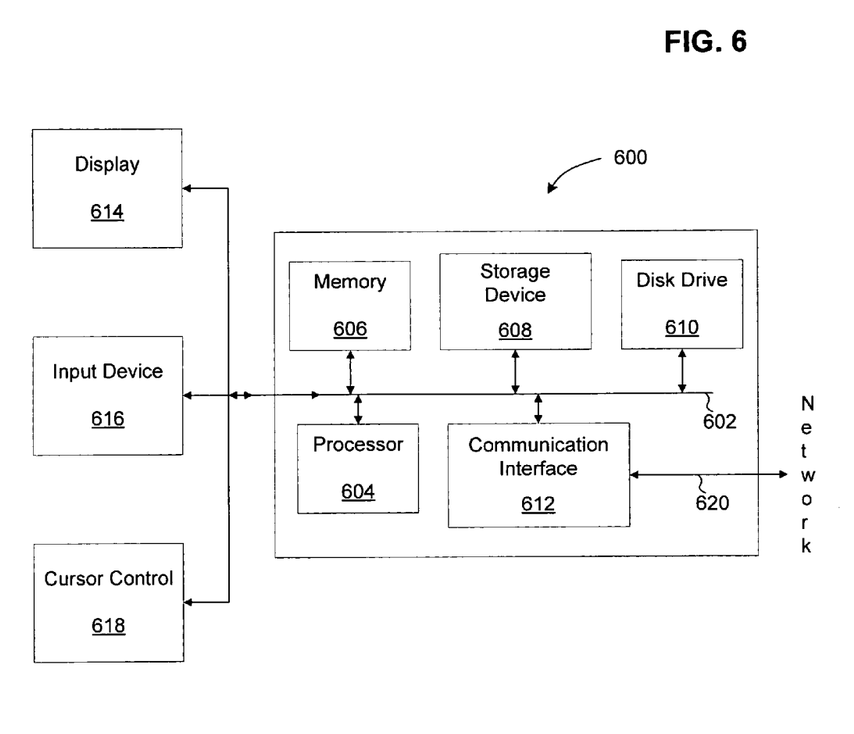
FIG. 6 illustrates an exemplary computer system suitable for analyzing and repairing documents.

FIG. 6 illustrates an exemplary computer system suitable for analyzing and repairing documents. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball). Processor 604 can be a single-core, dual-core, or multi-core processor; and processor 604 can be a processor in a multi-processor environment or a distributed processing environment.

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602 for transmitting a computer data signal.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed is:

1. A method, comprising:
   displaying a document in a single user interface, the document created by an application and formatted according to an established portable document standard;
   concurrent with said displaying, evaluating the document to detect one or more quality issues, said evaluating comprising comparing the document against the established portable document standard;
   responsive to said detecting the one or more quality issues, displaying the detected one or more quality issues relative to one or more parameters at a document report window in the single user interface;
   displaying an interactive quality indicator in the single user interface, the interactive quality indicator indicating a quality of the document based on the one or more detected quality issues, the interactive quality indicator displaying a first color when the quality of the document is above a threshold value and displaying a second color when the quality of the document is below the threshold value;
   displaying a document repair window in the single user interface, the document repair window indicating one or more document issues for repair;
   receiving input to the document repair window requesting a repair of the document with respect to at least one of the one or more document issues for repair; and
   in response to said receiving the input, causing a repair tool to perform the requested repair.

2. The method of claim 1, further comprising using a document viewer to perform said evaluating the document.

3. The method of claim 1, wherein said evaluating is performed by an evaluating process that runs as a background process.

4. The method of claim 1, wherein said evaluating the document does not substantially affect accessing the document.

5. The method of claim 4, wherein:
said evaluating the document is performed by an evaluating process; and
said accessing the document is performed by an accessing process;
wherein execution priority for the evaluating process is substantially lower than execution priority for the accessing.

6. The method of claim 1, wherein:
said evaluating the document is performed by an evaluating process; and
said performing the requested repair is performed by a repairing process;
wherein the evaluating process and the repairing process are different processes.

7. The method of claim 6, wherein the displaying and the evaluating are performed at a first location and the repairing process is executed as a hosted service at a second location.

8. The method of claim 6, wherein said performing the requested repair occurs prior to downloading the document.

9. The method of claim 1, wherein said performing the requested repair further comprises modifying the document to improve accessibility to the document.

10. The method of claim 1, wherein said evaluating the document comprises determining access over a data network to the document.

11. The method of claim 1, wherein said evaluating comprises determining whether the document is enabled for fast web view.

12. The method of claim 1, wherein the one or more detected quality issues comprises one or more discrepancies between the document and the established portable document standard.

13. The method of claim 1, wherein said evaluating comprises examining data associated with an embedded resource in the document.

14. The method of claim 13, wherein the embedded resource is an image or a font.

15. The method of claim 1, wherein said evaluating comprises examining a file size of the document.

16. The method of claim 1, wherein an editing application configured to edit the document performs said displaying the document, said evaluating the document, said displaying the interactive quality indicator, said receiving the input to the document repair window, and said causing the repair tool to perform the requested repair.

17. The method of claim 1, wherein said displaying the interactive quality indicator further comprises displaying an icon.

18. The method of claim 17, wherein the icon is displayed substantially apart from the document.

19. A system, comprising:
a memory configured to store data associated with a document; and
a processor configured to perform operations comprising:
displaying a document in a single user interface, the document created by an application and formatted according to an established portable document standard;
concurrent with said displaying, evaluating the document to detect one or more quality issues, said evaluating comprising comparing the document against the established portable document standard;
responsive to said detecting the one or more quality issues, displaying an interactive quality indicator in the single user interface, the interactive quality indicator indicating a quality of the document based on the one or more detected quality issues;
receiving an indication of one or more user-specified key criteria for the document;
displaying a document report window in the single user interface, the document report window including a display of the one or more detected quality issues relative to the one or more user-specified key criteria;
displaying a document repair window in the single user interface, the document repair window indicating one or more document issues for repair;
receiving input to the document repair window requesting a repair of the document with respect to at least one of the one or more document issues for repair; and
in response to said receiving the input, causing a repair tool to perform the requested repair.

20. The method of claim 1, wherein said evaluating comprises analyzing one or more of:
conformity of the document to the established portable document standard;
accessibility of the document to disabled persons;
a level of optimization of the document for Internet access; and
status of embedded resources for the document.

21. A method comprising:
displaying a document in a single user interface, the document formatted according to an established portable document standard;
concurrent with displaying the document, evaluating the document to detect one or more quality issues, said evaluating comprising comparing the document against the established portable document standard;
responsive to detecting the one or more quality issues, displaying the one or more detected quality issues at a document report window in the single user interface, said displaying the document, evaluating the document, and displaying the one or more detected quality issues performed at a first location;
receiving input at the document report window requesting a repair of the document with respect to at least one of the one or more detected quality issues; and
responsive to receiving input at the document report window, causing a repair tool to perform the requested repair, the repair tool executed as a hosted service at a second location.

* * * * *